(12) United States Patent
Evanovich et al.

(10) Patent No.: US 6,637,457 B2
(45) Date of Patent: Oct. 28, 2003

(54) ROTOMOLDED HYDRAULIC RESERVOIR WITH INSERTED BAFFLE

(75) Inventors: Steven R. Evanovich, Pittsburgh, PA (US); Alfred L. Baum, Pittsburgh, PA (US)

(73) Assignee: Schroeder Industries L.L.C., Mckees Rocks, PA (US)

( * ) Notice: Subject to any disclaimer, the term of this patent is extended or adjusted under 35 U.S.C. 154(b) by 240 days.

(21) Appl. No.: 09/844,495

(22) Filed: Apr. 27, 2001

(65) Prior Publication Data

US 2002/0000250 A1 Jan. 3, 2002

Related U.S. Application Data

(60) Provisional application No. 60/200,452, filed on Apr. 28, 2000.

(51) Int. Cl.[7] .................... F16K 24/00; E03B 11/00
(52) U.S. Cl. .................... 137/574; 137/549; 137/550; 220/4.14; 220/563
(58) Field of Search .................. 137/571, 574, 137/549, 550; 220/563, 564, 4.14

(56) References Cited

U.S. PATENT DOCUMENTS

| | | | |
|---|---|---|---|
| 1,310,517 A | 7/1919 | Xardell | |
| 1,562,074 A | 11/1925 | Baum | |
| 1,909,734 A | 5/1933 | Thwaits | |
| 1,924,741 A | 8/1933 | Hoopes et al. ............... 220/86 |
| 2,091,731 A | 8/1937 | Gredell .................... 220/22 |
| 2,379,126 A | 6/1945 | Welden .................... 220/63 |
| 2,538,336 A | 1/1951 | Smith ..................... 222/455 |
| 2,675,682 A | 4/1954 | Dobson .................... 62/1 |
| 2,715,040 A | 9/1955 | Rhoads, Sr. ............... 296/24 |
| 2,806,622 A | 9/1957 | Leirer .................... 220/5 |
| 2,860,809 A | 11/1958 | Perry .................... 220/22 |
| 3,364,292 A | 1/1968 | Lemelson ................. 264/275 |
| 3,610,457 A | 10/1971 | Opalewski ................ 220/22 |
| 3,645,416 A | 2/1972 | Main, Jr. ................ 220/22 |
| 3,912,107 A * | 10/1975 | Baumann ................. 220/444 |
| 4,023,257 A | 5/1977 | Wright et al. ............ 29/460 |
| 4,143,193 A | 3/1979 | Rees ..................... 428/35 |
| 4,350,258 A | 9/1982 | Rogers | |
| 4,431,027 A | 2/1984 | Sabina, Jr. .............. 137/574 |
| 4,517,231 A | 5/1985 | May et al. ............... 428/35 |
| 4,526,286 A | 7/1985 | Jung et al. .............. 220/22 |
| 4,611,724 A | 9/1986 | Watkins et al. ........... 220/5 A |
| 4,638,836 A | 1/1987 | Bailey ................... 137/574 |
| 4,664,958 A | 5/1987 | Jones .................... 428/36 |
| 4,789,170 A | 12/1988 | Reber .................... 280/5 D |
| 4,847,028 A | 7/1989 | Snyder et al. ............ 264/155 |
| 4,852,258 A | 8/1989 | Foster ................... 30/276 |
| 4,852,758 A | 8/1989 | Kormendi et al. .......... 220/20.5 |
| 4,994,132 A | 2/1991 | Liekens et al. ........... 156/245 |
| 5,076,703 A | 12/1991 | Loefke et al. ............ 366/61 |
| 5,127,432 A | 7/1992 | Duhaime et al. ........... 137/574 |
| 5,186,324 A | 2/1993 | Brandon, Jr. ............. 206/223 |
| 5,285,923 A | 2/1994 | Brandon, Jr. ............. 220/601 |
| 5,344,038 A | 9/1994 | Freeman et al. ........... 220/453 |
| 5,503,284 A | 4/1996 | Li ....................... 215/383 |
| 5,564,749 A | 10/1996 | Branham .................. 280/830 |
| 5,765,713 A | 6/1998 | Geisheker et al. ......... 220/562 |
| 5,850,933 A | 12/1998 | Pazik .................... 220/562 |
| 5,911,938 A | 6/1999 | El et al. ................ 264/261 |
| 5,960,981 A | 10/1999 | Dodson et al. ............ 220/563 |
| 5,975,687 A | 11/1999 | Powers ................... 347/87 |
| 6,032,819 A | 3/2000 | Hanna .................... 220/501 |
| 6,116,454 A | 9/2000 | Henderson et al. ......... 220/563 |
| 6,138,857 A | 10/2000 | Keller ................... 220/495.01 |
| 6,161,719 A | 12/2000 | Madison .................. 220/567 |
| 6,220,287 B1 | 4/2001 | Wolf ..................... 137/574 |
| 6,508,271 B2 * | 1/2003 | Evanovich et al. ......... 137/549 |

* cited by examiner

*Primary Examiner*—A. Michael Chambers
(74) *Attorney, Agent, or Firm*—BLK Law Group; Blynn L. Shideler; Krisanne Shideler

(57) ABSTRACT

A one-piece integral rotomolded hydraulic reservoir includes a plastic container body defining a container cavity for receiving hydraulic fluid. An insertable baffle is positioned in the container cavity through an access manway formed in the container body and is removable therefrom. The container body includes holding members for positioning and holding the baffle in place.

20 Claims, 5 Drawing Sheets

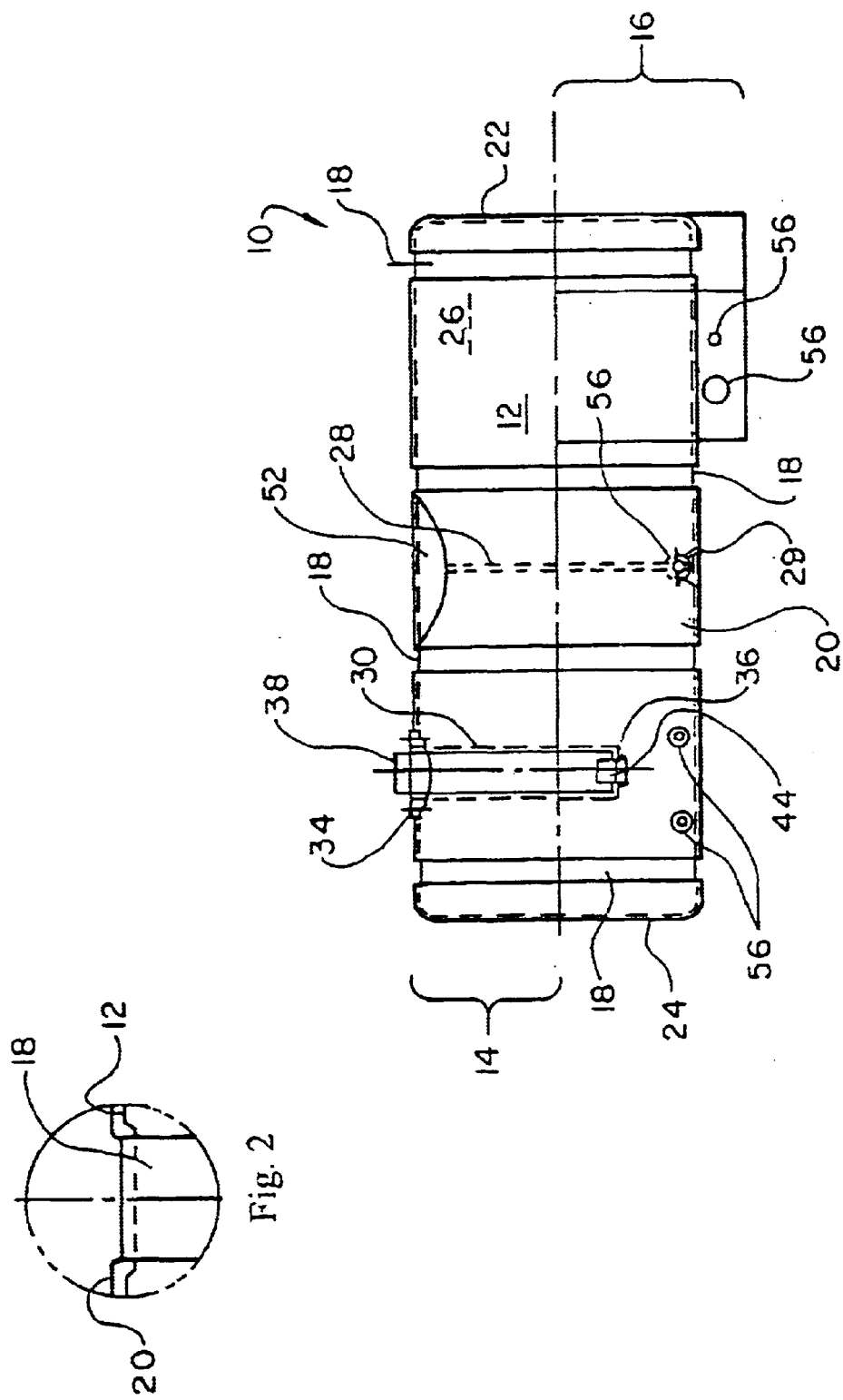

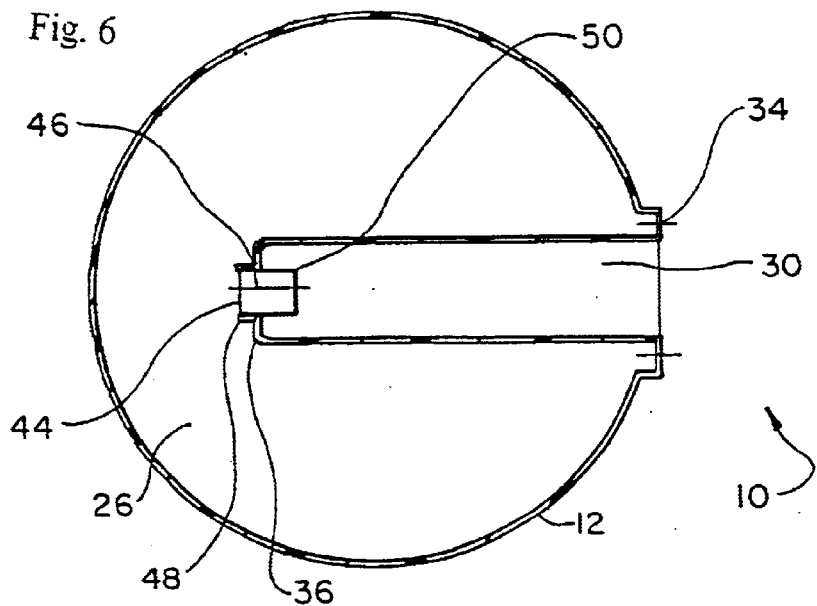
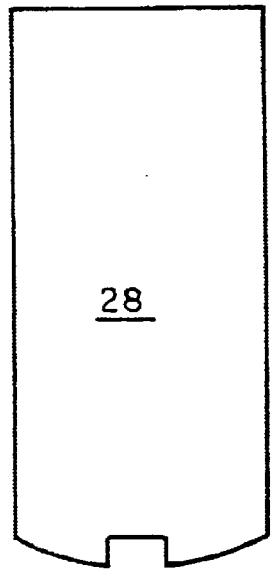
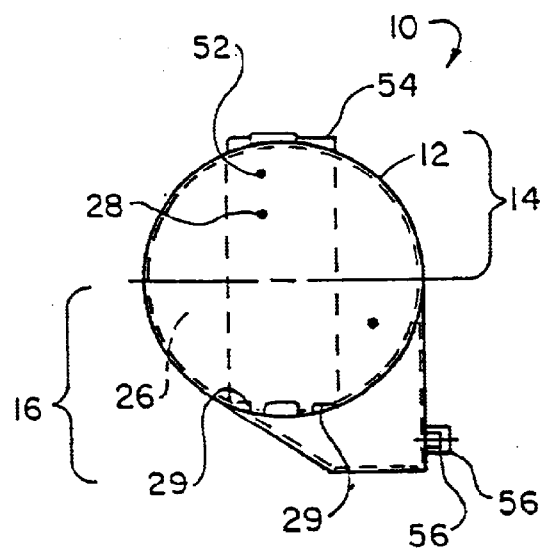

ROTOMOLDED HYDRAULIC RESERVOIR WITH INSERTED BAFFLE

RELATED APPLICATION

This application claims the benefit of co-pending U.S. Provisional Application Ser. No. 60/200,452 entitled "ROTOMOLDED HYDRAULIC RESERVOIR WITH INTEGRAL FILTER BOWL" filed on Apr. 28, 2000, which is incorporated herein in its entirety.

BACKGROUND OF THE INVENTION

1. Field of the Invention

The present invention relates to a hydraulic reservoir and, more particularly, to a hydraulic fluid reservoir formed by rotational molding with an inserted baffle.

2. Brief Description of the Prior Art

Rotational molding, or rotomolding, is a well-known method of forming objects from a plastic resin. It is often used for complex shapes including tanks and reservoirs. Various types of plastic resin can be used, such as polyethylenes, plastisols, nylons, fluoropolymers, polypropylenes, polyurethanes, and other suitable materials.

In general, a mold is loaded with a plastic resin and heated in an oven. As the mold is heated, the mold is rotated about two or three axes at a low speed. The heat melts the plastic resin inside the mold and melted resin coats the interior surface of the mold. The mold is then gradually cooled using air or water and the re-solidified plastic resin, which has assumed the shape of the interior walls of the mold, is removed from the mold. This process differs from injection molding in that the plastic resin is not pressurized (other than atmospheric pressure).

U.S. Pat. No. 5,285,923 illustrates the insertion of objects made of a material other than plastic resin into the object to be formed, such as brass inserts molded into a polyethylene material. In general, the insert is placed in a designated spot in the mold and the rotomolding process is initiated as described above. The melted plastic resin encapsulates the insert and the insert becomes part of the finished product. A problem is that the expansion and contraction properties of the resin and the inserted objects are not necessarily equal. Leaks or gaps can develop between the inserted object and the cooled plastic resin. This problem is amplified by the fact that plastic resin is known to shrink an appreciable amount as it cools. U.S. Pat. Nos. 3,364,292; 4,023,257; and 4,847,028; also discuss rotomolding with inserts added to the molded product. All of the above-cited references are incorporated herein by reference.

As noted in the above-cited prior art, rotomolding is well-suited for forming a plastic tank or reservoir structure. Such tanks are often used as hydraulic reservoirs for hydraulic systems, such as used in heavy machinery, including cranes, backhoes, demolition shears, bulldozers, and the like. In hydraulic systems, it is important to keep the hydraulic fluid free of debris. Consequently, filtering elements have been incorporated in the hydraulic systems to filter debris from the hydraulic fluid. Further, as set forth in U.S. Pat. Nos. 4,143,193 and 5,911,938 baffles are often incorporated into hydraulic reservoir tanks, as well as fuel tanks, to dampen the forces of moving liquid within the tank. The baffle designs suggested in these patents are integral with the finished tank. Further these designs increase the complexity of the mold, an increase in manufacturing time and expense.

It is an object of the present invention to provide a rotomolded hydraulic reservoir with an inserted baffle. It is a further object of the present invention to provide a rotomolded hydraulic reservoir with integral filter bowl having an extended integral filter enclosure with a coupling insert. It is another object of the present invention to provide a rotomolded hydraulic reservoir with a second fluid return. It is another object of the present invention to provide a hydraulic reservoir that is economically manufactured. It is a further object of the present invention to provide an effective, easily replaceable filter element for a hydraulic reservoir.

SUMMARY OF THE INVENTION

The above objects are achieved with a rotomolded hydraulic reservoir having an inserted baffle according to the present invention. The hydraulic reservoir is a one-piece tank structure. Specifically, the hydraulic reservoir includes a plastic container body defining a container cavity for receiving the hydraulic fluid. The insertable baffle is positioned in the container cavity through an access manway formed in the container body and is removable therefrom. The container body includes holding members for positioning and holding the baffle in place. A flange around the manway access may further include a baffle positioning mechanism, such as a pair of baffle receiving slots.

The removable baffle may be made of metal such as steel plate. The baffle may be held in place, in part, by opposed notches molded in the lower portion of the container body opposed from the manway access. The opposed notches may be formed as inwardly extending projections of the outer wall of the reservoir that are spaced to receive the baffle therebetween.

Several alternative modifications are possible with the inserted baffle design for the reservoir of the present invention. The holding members of the container body could be placed in a position extending from the sides of the reservoir, or may be offset from each other. The inserted baffle design of the present invention allows for a simple efficient mold construction while still allowing an efficient baffle to be easily positioned in and removed from the hydraulic reservoir.

The container body may form a filter cavity in fluid communication with the container cavity. A filter element coupling insert, such as a machined metallic bushing, may be molded in the container body adjacent the filter cavity. The insert defines an opening, specifically an internal bore, providing the communication between the container cavity and the filter cavity. A removable filter element is positioned within the filter cavity and coupled to the insert. The removable filter element seals to the exterior of the insert.

In order to help ensure a positive seal between the resin and the part to be included, the present invention generally provides a container body forming a filter cavity with an end having, in cross-section, a bowl-shape. The insert is positioned adjacent to the cross-sectional bowl-shape of the filter cavity. The bowl-shape offers controlled shrinkage tolerances in the general vicinity of the insert.

These and other advantages of the present invention will be clarified in the description of the preferred embodiments taken together with the attached drawings in which like reference numerals represent like elements throughout.

BRIEF DESCRIPTION OF THE DRAWINGS

FIG. 1 is a front side view of a rotomolded hydraulic reservoir according to the present invention;

FIG. 2 is an enlarged view of an integral molded rib of the reservoir shown in FIG.

FIG. 5 is a side view of a baffle insertable in the hydraulic reservoir of FIGS. 1–3;

FIG. 6 is a sectional view taken along line B—B of FIG. 4;

FIG. 7 is an end view of the hydraulic reservoir shown in FIGS. 1–3;

DETAILED DESCRIPTION OF THE PREFERRED EMBODIMENTS

Figure 3:
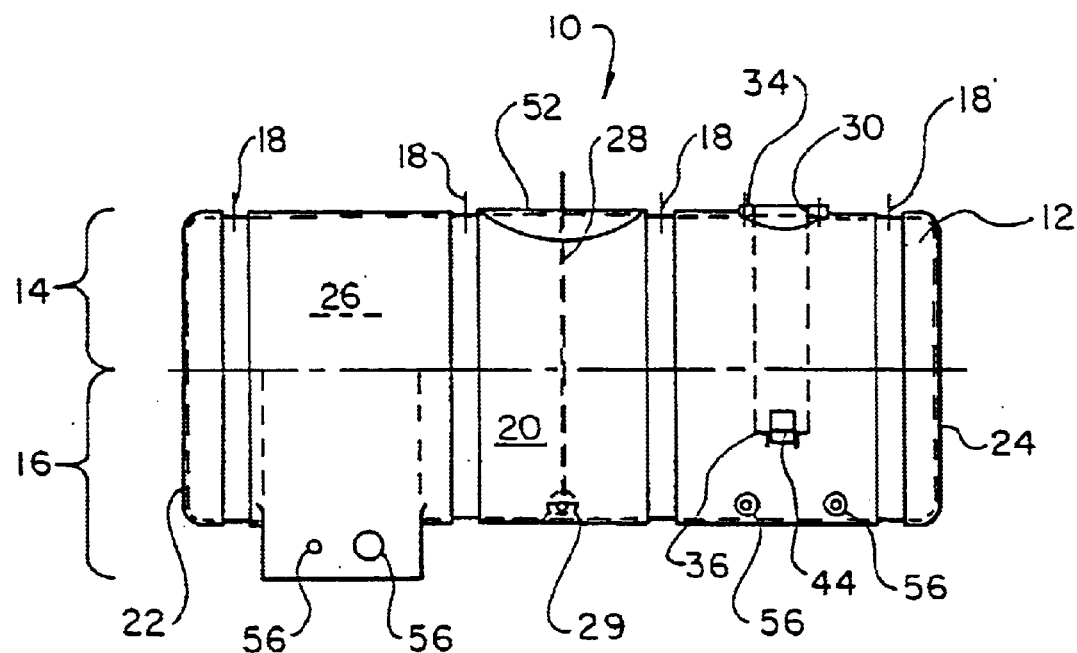
FIG. 3 is an rear side view of the present invention shown in FIG. 1.
Figure 4:
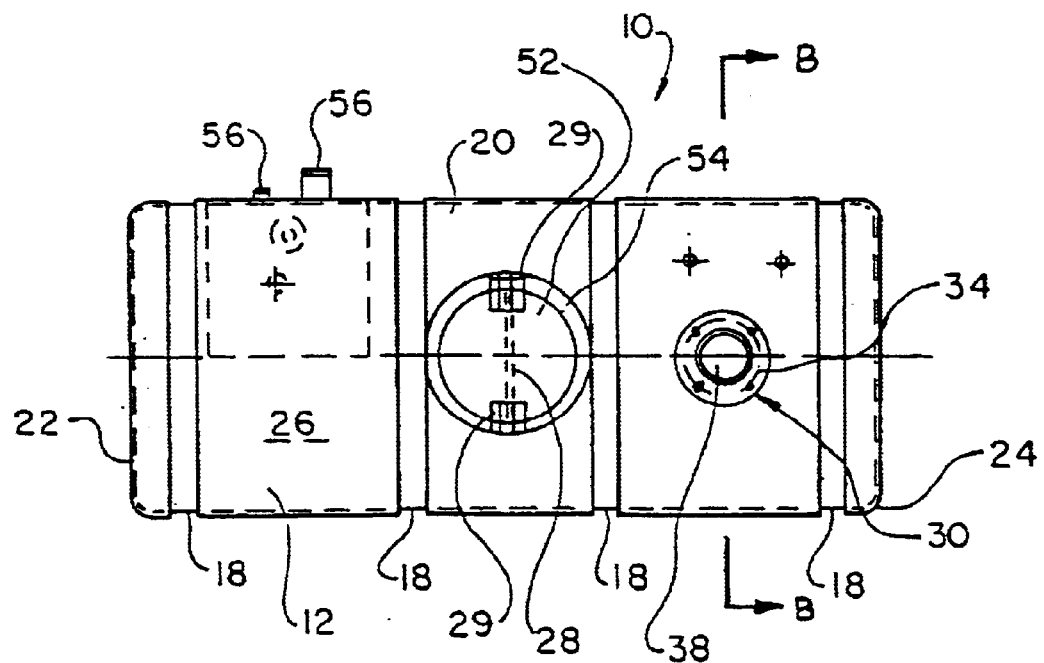
FIG. 4 is a top view of the container shown in FIGS. 1 and 3.
Figure 8:
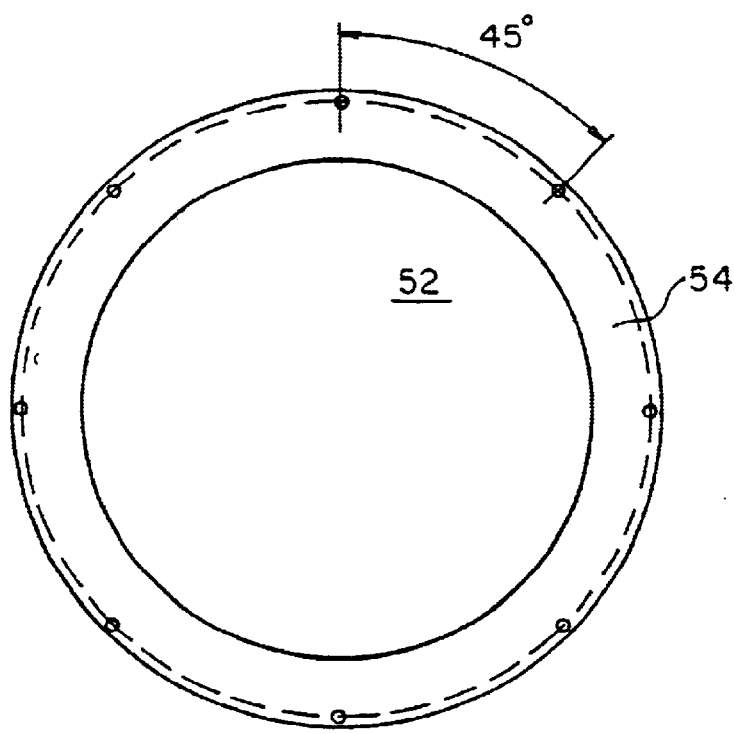
FIG. 8 is an enlarged top view of a manway access of the hydraulic reservoir shown in FIG. 4.
Figure 9:
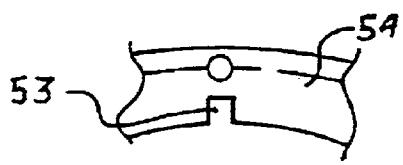
FIG. 9 is an enlarged bottom view of a baffle holding slot of the manway access of FIG. 8.
Figure 10:
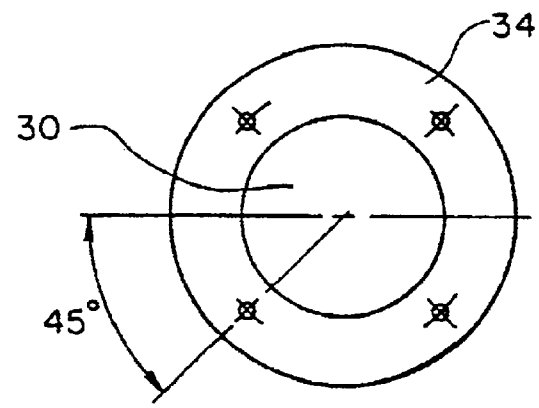
FIG. 10 is a top view of a filter cavity flange of the hydraulic reservoir shown in FIG. 4.
Figure 11:
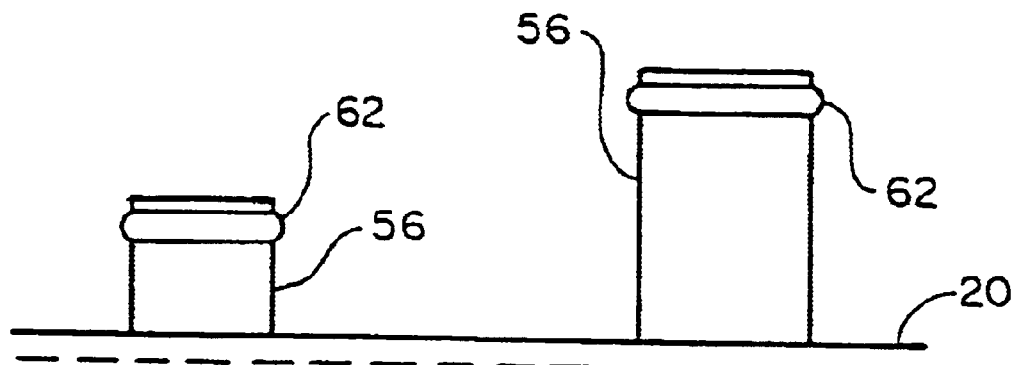
FIG. 11 is an enlarged plan view of outlet ports of the hydraulic reservoir shown in FIG. 1.

One embodiment of the present invention is shown in FIGS. 1–12. As shown in FIGS. 1–4, the present invention is a one-piece integral container or hydraulic reservoir 10, which may be formed as a generally cylindrically-shaped hydraulic reservoir 10. Rotomolding allows for a variety of complex shapes to be easily molded such that the hydraulic reservoir 10 may be rectangular or other shapes dictated mainly by the intended use or environment of the hydraulic reservoir 10. The hydraulic reservoir 10 has a container body 12 having a first upper portion 14, a second lower portion 16, a plurality of annular depressions or circumferential ribs 18 extending around the hydraulic reservoir 10, an exterior surface 20, a first body side 22, and a second body side 24. The first portion 14 and the second portion 16 are delineated by an imaginary plane passing through a midpoint, or centerline, of the container body 12. The annular depressions or ribs 18 form reinforcing ridges for the hydraulic reservoir 10 and are shown in detail in FIG. 2. The ribs, 18 are particularly useful for the hydraulic reservoir 10, which may have an expected operating temperature range of –20° F. to 180° F. The first portion 14, second portion 16, and sides 22, 24 of the hydraulic reservoir 10 form a container cavity 26. The term "hydraulic reservoir" within the meaning of this application refers to a container for holding working fluid that is conveyed and returned to the reservoir in a circulating system or a holding container for a fuel. Generally, the working fluid is for hydraulic power or for lubrication such as petroleum and water-based fluids.

The hydraulic reservoir 10 is preferably formed by rotomolding of a plastic resin resistant to chemical reactions with battery acid, hydraulic fluid, oil, transmission fluid, or UV light. Such plastic resins include but are not limited to treated polyethylenes, plastisols, nylon, fluoropolymers, polypropylene, polycarbonate, cellulose acetate, butyrate, elastomers, ionomer, polyurethane, EVA and other specially formulated compounds. The first and second portions 14, 16 and sides 22, 24 are approximately 0.25 inches thick, depending on the material selected and the ability to withstand operating temperature ranges of generally –20° F. to 150° F. and up to 180° F. intermittent. The tensile strength is preferably per ASTMD638 of 2600 PSI and the impact strength should be good to about –20° F./–40° F. The fluid capacity of the hydraulic reservoir 10 is in excess of 150 gallons, however the hydraulic reservoir 10 may be sized to the desired operating conditions. These criteria result in the hydraulic reservoir 10 being well-suited for use as a hydraulic reservoir in the hydraulic system of heavy equipment, such as a mobile crane. Although, the present invention is particularly designed for rotomolding, other molding techniques such as possibly blow molding may be used to form the present invention.

A removable baffle 28 (shown in detail in FIG. 5) may be inserted into the container cavity 26 through a manway access 52. The baffle 28 may be made of metal such as 0.19" thick mild steel plate, or other appropriate material. The baffle 28 may be held in place, at least in part, by opposed notches 29 molded in the lower portion 16 as shown in FIGS. 1, 3, 4 and 7. The baffle 28 controls (e.g. dampens) the movement of fluid and gases in the container cavity 26 and assures the mixing of oil within the container cavity 26 to assure temperature equalization of the fluid in operation. The opposed notches 29 are preferably formed as inwardly extending projections of the outer wall of the hydraulic reservoir 10 such that they can be easily formed by rotomolding. The notches 29 are spaced to receive the baffle 28 therebetween as shown in FIG. 5. The notches 29, or projections, thereby form baffle holding members for the hydraulic reservoir 10. The upper end of the baffle 28 may be secured to the manway access cover plate or lid (not shown). Alternatively, or in addition, the upper end of the baffle 28 is received in a pair of opposed slots 53 formed in the flange 54 formed around the manway access 52. The slots 53 also form a baffle holding mechanism for the hydraulic reservoir 10. A baffle is a term referring to a structure within the container body 12, which is designed to effect the fluid flow within the container body 12. The ribs 18, for example, would not be considered as a baffle since the ribs 18 have no appreciable effect on flow within the container body 12.

Several alternative modifications are possible with the inserted baffle 28 design for the hydraulic reservoir 10 of the present invention. For example, the notches 29 could be placed in a position extending from the sides of the hydraulic reservoir 10, or may be offset in a different pattern rather than opposed in pairs as shown. The inserted baffle design of the present invention allows for a simple efficient mold construction while still allowing an efficient baffle to be easily incorporated into the hydraulic reservoir 10. Additionally, the present design allows the design of the baffle 28 to be changed to accommodate a different use of the hydraulic reservoir 10. For example, the use of the hydraulic reservoir 10 at a different operating temperature may lead to a design to change the internal flow pattern. The internal flow pattern can be easily changed by modifying the baffle to accommodate specific use of the hydraulic tank 16.

The first portion 14 of the container body 12 forms, in cross-section, a generally U-shaped filter cavity 30 which extends toward the second portion 16 of the container body 12. Returning again to FIGS. 1–6, the filter cavity 30 has a first end 34 and a second end 36, with the second end 36 forming, in cross-section, a bowl shape which offers controlled shrinkage tolerances in the general vicinity of a metallic fluid element coupling insert 44 (discussed below). The first end 34 shown in FIG. 10 forms a connecting flange for a filter inlet coupling (not shown) to which one or more return lines may be coupled. The filter cavity 30 receives a conventional removable, replaceable filter element 33 connected to the insert 44 positioned adjacent the second end 36 of the filter cavity 30. The insert 44 is preferably a machined aluminum or brass bushing forming an insert cavity or bore 46, a first bushing end 48, and a second bushing end 50. The first bore 46 is preferably threaded for fastening to the inside of the mold during the rotomolding process. A conventional filter element 38 includes a connecting bore coupled to the outside diameter of the insert 44 through a sealing O-ring. The O-ring may be integral with the filter element 38 or provided as a separate element. If the O-ring is integral to the filter element 38, then the filter element 38 with the integral O-ring is pressed onto the insert 44. If the O-ring is a separate element, the O-ring is first positioned around the insert 44 or within the connecting bore of the filter around the insert 44 or within the connecting bore of the filter element 38 and then the filter element 38 is pressed into position. Any type of fluid tight connection between a conventional filter element 38 and the insert 44 is contemplated.

The metal insert 44 provides a more secure seal with the replaceable filter element 38 than having the seal be formed between the filter element 38 and the plastic forming the remainder of the container 10. The smooth outside of the insert 44 allows the use of a conventional replaceable filter element 38. The second end 36 of the filter cavity 30 is below the normal fluid level for the hydraulic reservoir 10. A normal fluid level for a hydraulic reservoir varies between rest and operating conditions. Although, dynamic, the term normal fluid level is a specific defined range unique to a given hydraulic reservoir and a given application.

The first portion 14 of the container body 12 also forms the manway access 52 for inserting the baffle 28 or easily filling hydraulic reservoir 10 with hydraulic fluid, or other desired fluid. The access 52, shown in FIG. 7, is preferably covered with the lid (not shown), preferably a fourteen gauge powder coated metal lid with provisions for an air breather (not shown) and shield (not shown). The lid attaches to the container body 12 via the band or flange 54, which is also incorporated into the upper portion 14 of the container body 12.

Figure 12:
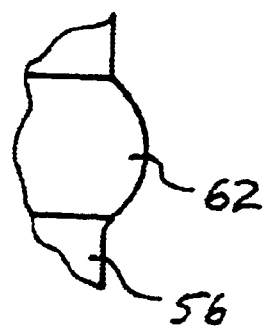
FIG. 12 is a further enlarged side view of the bead of an outlet port shown in FIG. 11.

Ports 56, such as 1.00 or 1.25 N.P.T. nozzles, are positioned adjacent the second portion 16 of the container body 12, as shown in FIGS. 1–7. An inside surface 60 of each port 56 is free from plastic resin material. As shown in FIG. 12, the ports 56 can have a barb or bead 62 for helping to secure a hose with room for a hose clamp. In operation, the ports 56 would supply one or more hydraulic users in the hydraulic system with the hydraulic fluid return being through the filter element 38 which removes debris, such as grit, metal filings, and the like from the hydraulic fluid. The formation of the hydraulic reservoir 10 with integral filter bowl effectively combines the reservoir and the filtering unit while allowing the use of standard replaceable filters. Further, the incorporation of the insert 44 provides an effective seal between the filter element 38 and the hydraulic reservoir 10.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A hydraulic reservoir comprising:
    a plastic container body defining a container cavity, the container body having projections extending inwardly from an outer wall of the container body and a manway access for accessing the container cavity; and
    an insertable baffle positioned in the container cavity adjacent the projections of the container body, wherein the baffle is inserted into the container cavity through the manway access and is held in position in the container cavity, at least in part, by the projections of the container body.

2. The hydraulic reservoir as claimed in claim 1 wherein the body further includes a filter cavity in fluid communication with the container cavity and the reservoir further includes an insert held in position molded in the container body adjacent the filter cavity; and a removable filter element positioned within the filter cavity and coupled to the insert.

3. The hydraulic reservoir as claimed in claim 1 wherein the container body is a rotomolded, one-piece structure.

4. The hydraulic reservoir as claimed in claim 1 wherein the insertable baffle is a metal plate having a smooth external surface.

5. The hydraulic reservoir as claimed in claim 1 wherein the container body includes a plurality of outlet ports and at least one return port.

6. The hydraulic reservoir as claimed in claim 1 wherein the container body forms the projections for holding the baffle on a side of the reservoir opposite from the access manway.

7. The hydraulic reservoir as claimed in claim 6 further including means to hold the baffle positioned near the access manway.

8. The hydraulic reservoir as claimed in claim 6 wherein the container body includes a flange having a pair of slots therein receiving the insertable baffle.

9. The hydraulic reservoir as claimed in claim 1 wherein the insertable baffle extends substantially perpendicular to a longitudinal axis of the container body.

10. The hydraulic reservoir as claimed in claim 1 wherein the container body includes a flange having a pair of slots therein receiving the insertable baffle.

11. The hydraulic reservoir as claimed in claim 1 wherein the container body includes at least one outlet port and at least one return port wherein the baffle is positioned between the outlet port and the return port.

12. The hydraulic reservoir as claimed in claim 11, wherein the outlet port is at a lower portion of the container body.

13. The hydraulic reservoir as claimed in claim 12 wherein a filter cavity forms the fluid return.

14. The hydraulic reservoir as claimed in claim 1 wherein the container body includes a plurality of outlet ports and at least one return port, wherein a filter element coupling insert is integrally molded in a filter cavity which forms the return port.

15. A hydraulic reservoir comprising:
    an integral, one-piece plastic container body;
    a container cavity formed by the container body for holding hydraulic fluid, the hydraulic fluid defining a normal fluid level line within the container cavity;
    a manway access formed in the container body providing access to the container cavity;
    at least one baffle holding member formed in the container body;
    an insertable baffle positioned in the container cavity adjacent the at least one baffle holding member, the baffle positioned in the container cavity through the manway access;
    at least one return port in the container body in fluid communication with the container cavity; and at least one outlet port positioned near a bottom of the container body in fluid communication with the container cavity.

16. The hydraulic reservoir as claimed in claim 15 further including a filter cavity formed by the container body and extending from an upper portion of the container body into the container cavity and in fluid communication with the container cavity, the filter cavity forming the return line for returning hydraulic fluid to the container cavity, wherein a fluid coupling between the filter cavity and the container cavity extends to a level below the normal fluid level line.

17. The hydraulic reservoir as claimed in claim 15 wherein the container body includes projections for holding the baffle forming a plurality of baffle holding members that are on a side of the reservoir opposite from the access manway.

18. The hydraulic reservoir as claimed in claim 15 further including a flange surrounding the manway access, the flange having a pair of slots therein receiving the insertable baffle.

19. The hydraulic reservoir as claimed in claim 15 wherein the insertable baffle is positioned between the return port and the outlet port.

20. A hydraulic reservoir comprising:
   a plastic container body;
   a container cavity formed by the container body for holding hydraulic fluid;
   a filter cavity formed by the container body and extending from an upper portion of the container body into the container cavity and in fluid communication with the container cavity, the filter cavity forming a return line for returning hydraulic fluid to the container cavity;
   an insertable baffle positioned within the container cavity, wherein the baffle is removable through a manway access in the container body; and
   at least one outlet port positioned near a bottom of the container body in fluid communication with the container cavity.

* * * * *